United States Patent
Mayer et al.

(10) Patent No.: US 9,054,921 B2
(45) Date of Patent: Jun. 9, 2015

(54) METHOD AND APPARATUS FOR GENERATING A PLURALITY OF MODULATED SIGNALS

(71) Applicant: Intel Mobile Communications GmbH, Neubiberg (DE)

(72) Inventors: Christian Mayer, Linz (AT); Harald Pretl, Schwertberg (AT); Patrick Ossmann, Linz (AT); Jan Zaleski, Linz (AT); Krzysztof Dufrene, Plesching (AT)

(73) Assignee: Intel Mobile Communications GmbH, Neubiberg (DE)

( * ) Notice: Subject to any disclaimer, the term of this patent is extended or adjusted under 35 U.S.C. 154(b) by 57 days.

(21) Appl. No.: 13/799,853

(22) Filed: Mar. 13, 2013

(65) Prior Publication Data

US 2014/0269993 A1     Sep. 18, 2014

(51) Int. Cl.
H04L 27/12    (2006.01)

(52) U.S. Cl.
CPC .................................... *H04L 27/12* (2013.01)

(58) Field of Classification Search
USPC .......................................... 332/127; 375/303
See application file for complete search history.

(56) References Cited

U.S. PATENT DOCUMENTS

| | | | |
|---|---|---|---|
| 6,292,462 B1 | 9/2001 | Cook et al. | |
| 8,120,389 B2 | 2/2012 | Xiu | |
| 8,693,307 B2 | 4/2014 | Egawa et al. | |
| 2007/0110194 A1 | 5/2007 | de Obaldia et al. | |
| 2008/0317188 A1 | 12/2008 | Staszewski et al. | |
| 2009/0046790 A1 | 2/2009 | Soliman | |
| 2009/0190694 A1 | 7/2009 | Kobayashi | |
| 2010/0091919 A1 | 4/2010 | Xu et al. | |
| 2010/0128829 A1 | 5/2010 | Drugge et al. | |
| 2010/0260242 A1 | 10/2010 | Abe et al. | |
| 2010/0323643 A1 | 12/2010 | Ridgers | |
| 2011/0064150 A1 | 3/2011 | Uozumi et al. | |
| 2011/0148490 A1 | 6/2011 | Lee et al. | |
| 2012/0176196 A1 | 7/2012 | Khlat | |
| 2012/0320769 A1 | 12/2012 | Callender | |
| 2013/0058300 A1 | 3/2013 | Perets et al. | |
| 2013/0099829 A1 | 4/2013 | Vilander et al. | |
| 2013/0136211 A1 | 5/2013 | Jussila et al. | |
| 2013/0279633 A1 | 10/2013 | Morris et al. | |

OTHER PUBLICATIONS

U.S. Appl. No. 13/832,651, filed Mar. 15, 2013.
Pavlovic, N. et al.: "A 5.3GHz Digital-to-Time-Converter-Based Fractional-N All-Digital PLL" In: IEEE Solid-State Circuits Conference Digest of Technical Papers (ISSCC), Feb. 2011, pp. 54-56.
Chen, P. et al.: "FPGA Vernier Digital-to-Time Converter With 1.58 ps. Resolution and 59.3 Minutes Operation Range" In: IEEE Transactions on Circuits and Systems I, vol. 57, Issue 6, Jun. 2010, pp. 1134-1142.

(Continued)

*Primary Examiner* — Joseph Chang
(74) *Attorney, Agent, or Firm* — Eschweiler & Associates, LLC

(57) ABSTRACT

A method and an apparatus provide a plurality of modulated signals by frequency shifting an output signal of a carrier signal generation circuit for obtaining a first carrier signal and a second carrier signal, and by modulating the first and second carrier signals.

8 Claims, 4 Drawing Sheets

(56) References Cited

OTHER PUBLICATIONS

Choi, Y.-C. et al.: "A Fully Digital Polar Transmitter Using a Digital-to-Time Converter for High Data Rate System" In: IEEE Radio-Frequency Integration Technology RFIT 2009, Jan. 2009, pp. 56-59.
Roberts, G. W. et al.: "A Brief Introduction to Time-to-Digital and Digital-to-Time Converters" In: IEEE Transactions on Circuits and Systems II, vol. 57, No. 3, Mar. 2010, pp. 153-157.
3GPP TR 36.912 v.1 0.0.0 "L TE; Feasibility study for Further Advancements for E-UTRA (LTE-Advanced)" ETSI TR 136 912 V1 0.0.0 (Mar. 2011).
Yonis et al., "Effective Carrier Aggregation on the LTE-Advanced Systems" International Journal of Advance Science and Technology, vol. 41, Apr. 2012.
Zemeda, M., "LTE-Advanced Design and Test Challenges—Carrier Aggregation," Agilent Technology, slides 2-35, 2012.
Office Action dated Aug. 15, 2014 for U.S. Appl. No. 13/832,651.
Final Office Action Dated Feb. 12, 2015 U.S. Appl. No. 13/832,651.
Notice of Allowance Dated Apr. 30, 2015 U.S. Appl. No. 13/832,651.

METHOD AND APPARATUS FOR GENERATING A PLURALITY OF MODULATED SIGNALS

FIELD

Methods and apparatus for generating a plurality of modulated signals, for example a plurality of I/Q modulated signals or a plurality of polar modulated signals are described.

BACKGROUND

Circuits for generating a plurality of modulated signals operate on the basis of a plurality of carrier signal generation circuits, for example a plurality of phase locked loop circuits (PLLs), to generate the respective carrier signals that may be modulated with respective modulation signals for obtaining the plurality of modulated signals.

SUMMARY

A method comprises frequency shifting an output signal of a carrier signal generation circuit to obtain a first carrier signal and a second carrier signal at different frequencies, modulating the first carrier signal, and modulating the second carrier signal.

DETAILED DESCRIPTION

Figure 1:
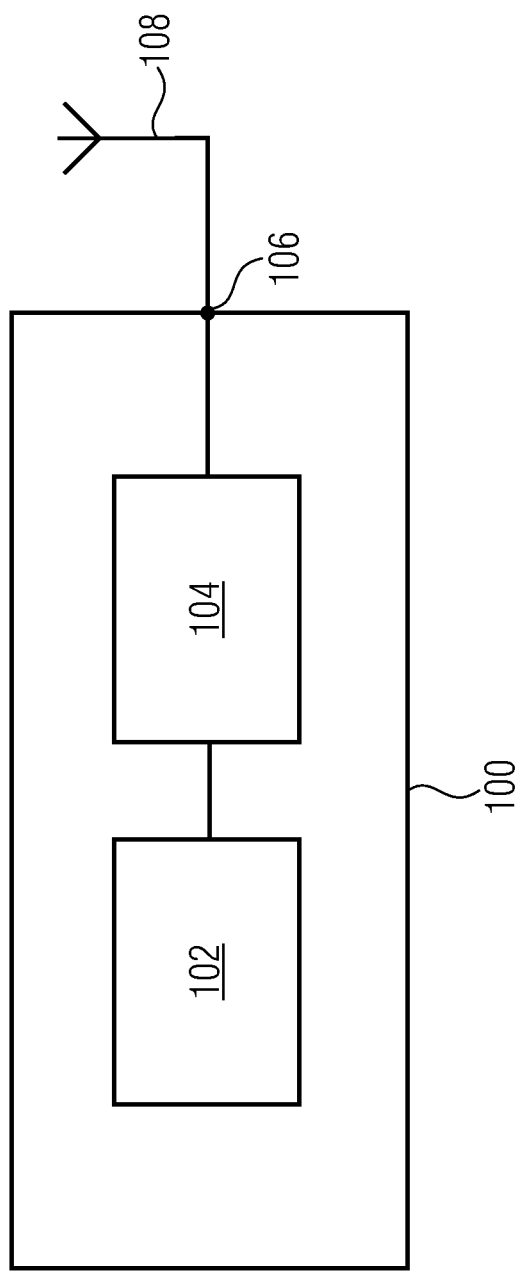
FIG. 1 shows a block diagram of an example mobile communication device.

FIG. 1 shows a block diagram of an example mobile communication device 100 comprising a digital baseband processor 102, an RF front end 104 coupled to the baseband processor 102 and to an antenna port 106. The antenna port 106 is provided to allow connection of an antenna 108 to the mobile communication device 100. The baseband processor 102 generates signals to be transmitted via the antenna 108 which are forwarded to the RF front end 104 generating a transmit signal output to the antenna port 106 for transmission via the antenna 108. The RF front end 104 may also receive signals via the antenna port 106 from the antenna 108 and provides respective signals to the baseband processor 102 for processing the received signals. The apparatus and the method described in further detail in the following may be implemented in the baseband processor 102, for example in a processor operating on data signals for generating the respective input signals to the RF front end 104, and/or in the RF front end 104, like in a polar transmitter used for generating the transmit signal output at antenna port 106 based on inputs signals received from the baseband processor.

The mobile communication device 100 may be a portable mobile communication device and may be configured to perform a voice and/or data communication according to a mobile communication standard with other communication devices, like other mobile communication devices or base stations of a mobile communication network. Mobile communication devices may comprise a mobile handset, such as a mobile phone or a smart phone, a tablet PC, a broadband modem, a laptop, a notebook, a router, a switch, a repeater or a PC. Also, the mobile communication device 100 may be a base station of a communication network.

Figure 2:
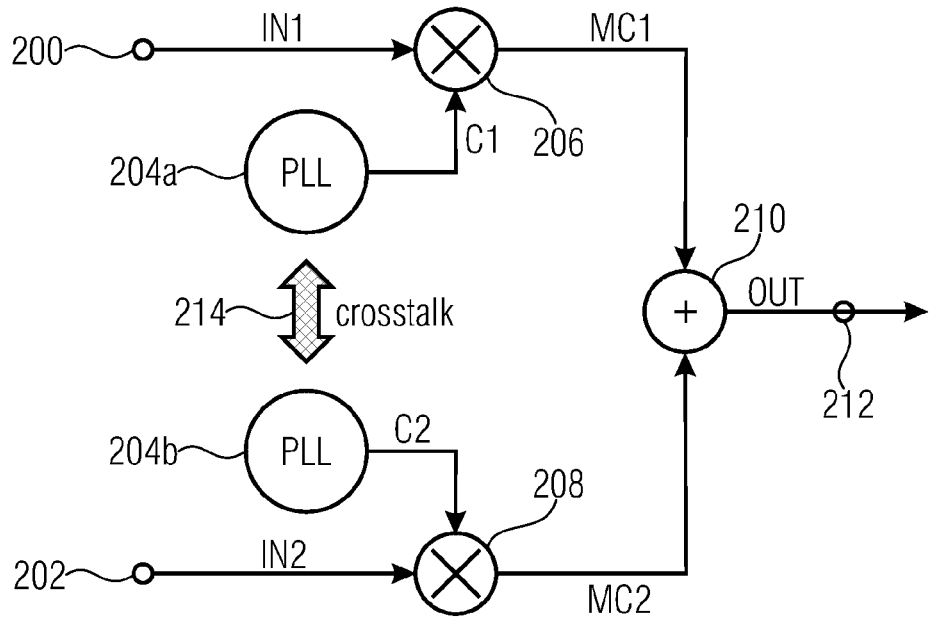
FIG. 2 is a schematic representation of a circuit for generating multicarrier signals using two phase locked loop circuits (PLLs)

FIG. 2 is a schematic representation of a circuit for generating multicarrier signals using two phase locked loop circuits (PLLs). The circuit of FIG. 2 comprises a first input 200 for receiving a first signal IN1 on the basis of which a carrier signal is to be modulated. A second signal IN2 that is used for modulating a second carrier signal can be received at a second input 202 of the circuit. The circuit comprises a first PLL circuit 204a and a second PLL circuit 204b. Each PLL circuit 204a, 204b generates a carrier signal C1 and C2, respectively, at the desired frequencies. The circuit further comprises a first modulator circuit 206 and a second modulator circuit 208. The first modulator circuit 206 is connected to the input 200 and to the first PLL circuit 204a for receiving at its inputs the first input signal IN1 and the first carrier signal C1. The modulator circuit 206, based on the received signals, generates a modulated carrier signal MC1. The second modulator circuit 208 is connected between the second input 202 and the second PLL circuit 204b and receives at its inputs the second input signal IN2 and the second carrier signal C2. The second modulator circuit 208 generates based on the received signals a second modulated carrier signal MC2 that is output from the second modulator circuit 208. The circuit of FIG. 2 further comprises a combiner 210 coupled between the first and second modulator circuit 206, 208 and an output 212 of the circuit. The combiner 210 receives at its two inputs the modulated carrier signals MC1 and MC2 and combines these two signals into a common output signal OUT at the output 212 of the circuit.

As can be seen from FIG. 2, to generate the multicarrier signals MC1 and MC2, separate PLL circuits 204a and 204b are used for generating the respective carriers C1 and C2, at the desired frequencies. However, these PLL circuits 204a and 204b may interfere with each other, for example there may be crosstalk between the two PLL circuits 204a and 204b, as is schematically indicated at 214 in FIG. 2. This undesired crosstalk may result in the reduction of the performance and/or in the creation of unwanted spectral emissions so that it is desired to avoid crosstalk issues when generating multicarrier signals.

In FIG. 2, the modulation is shown schematically by the modulator circuits 206 and 208 without giving any details about the actual modulation implementation which may be an I/Q modulation or a polar modulation. In accordance with examples, the modulator circuits 206 and 208 may comprise respective mixer circuits.

To avoid crosstalk when generating multicarrier signals, in accordance with examples, a method and an apparatus are provided in accordance with which an output signal of a carrier signal generating circuit, for example a PLL circuit, is frequency shifted. For example, the carrier signal generating circuit may be a single or common PLL circuit that is "single" or "common" insofar as it provides the respective carrier signals on the basis of a single output signal. The single output signal is provided at a specific frequency that may be fixed or that may be dynamically changed. This output signal is subjected to a frequency shifting operation for obtaining the first carrier signal and the second carrier signal at the respective different frequencies desired for the two carrier signals which are then modulated in a desired way, for example by an I/Q modulation or a polar modulation. Examples of the method and the apparatus may apply the output signal as a first carrier signal to a first modulator and as a second carrier signal to a second modulator, wherein at least one of the first and second carrier signals is frequency shifted when compared to the original output signal or non-shifted carrier signal as provided by the carrier signal generation circuit. Alternatively, both the first and second carrier signals may be subjected to a frequency shift, wherein the respective frequency shifts applied to the output signal of the carrier signal generation circuit may be different.

Figure 3:
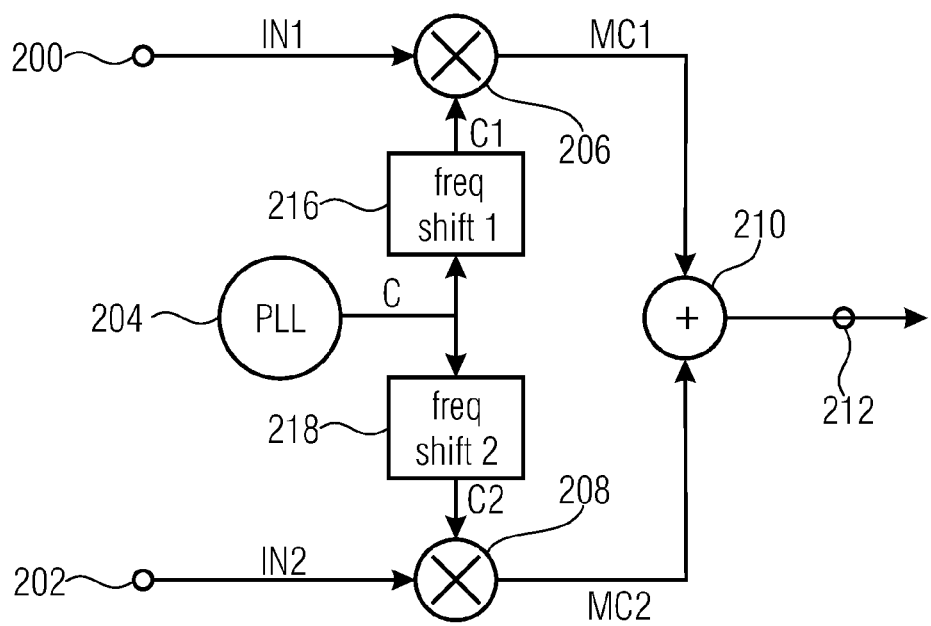
FIG. 3 shows a schematic representation of a circuit for generating a multicarrier signal using one PLL circuit.

FIG. 3 shows a schematic representation of a circuit for generating a multicarrier signal using one PLL circuit. In FIG. 3, elements already described with regard to FIG. 2 have associated therewith the same reference signs, and FIG. 3 shows the basic concept of using only one PLL circuit for generating two carrier signals at different frequencies. As can be seen from FIG. 3, instead of providing two PLL circuits as shown in FIG. 2, only one PLL circuit 204 is provided outputting a carrier signal C. It is noted that in the examples described, the carrier signal generation circuit comprises a PLL circuit, however, it is noted that also other approaches known it the art for generating an output signal at a desired frequency can be applied and that in conventional approaches using two or more of such circuits also crosstalk problems may occur which are avoided in accordance with the examples described here, namely by providing only one or a single carrier signal generation unit, for example one PLL circuit 204 as it is depicted in FIG. 3.

The circuit of FIG. 3 further comprises a first frequency shifter circuit 216 and a second frequency shifter circuit 218. The first frequency shifter circuit 216 is connected between the PLL circuit 204 and the first modulator circuit 206, and the second frequency shifter circuit 218 is connected between the PLL circuit 204 and the second modulator circuit 208. The two frequency shifter circuits 216 and 218 both receive the carrier signal or non-frequency shifted output signal C of the PLL circuit 204 and cause a frequency shift in this signal C for obtaining the respective carrier signals C1 and C2 applied to the modulator circuits 206, 208, respectively. The further functionality of the circuit of FIG. 3 is similar to that of FIG. 2 in that the modulator circuits 206 and 208 operate on the basis of the received input signals IN1 and IN2, respectively, and on the basis of the two carrier signals C1 and C2, respectively, for generating the respective modulated carrier signals MC1 and MC2 that in the example of FIG. 3 may also be combined by the combiner 210 into the single output signal OUT provided at the circuit output 212.

Thus, in accordance with the example depicted in FIG. 3, one unmodulated carrier signal C at a desired frequency is generated, for example, the frequency of the carrier signal C may be selected substantially in the middle of an aggregated signal band that is defined by the desired frequencies of the respective carrier signals C1 and C2. By means of the frequency shifter circuits 216 and 218 a respective frequency shift is applied to the carrier signal C for shifting it to the destination carrier frequencies associated with the first and second carrier signals C1 and C2. Then, by means of the schematically shown modulators circuits 206, 208, a modulation is carried out on the basis of the input signals IN1 and IN2, for example an I/Q modulation or a magnitude/phase modulation, and the modulated carrier signals MC1 and MC2 are output. In FIG. 3, it is depicted that the modulated carrier signals MC1 and MC2 are combined into a single output signal OUT, for example for applying it to a single output chain comprising a power amplifier and an antenna. However, it is noted that in accordance with other examples, the two modulated carrier signals MC1 and MC2 can also be sent out via different outputs, i.e. without being combined, to be further processed via separate output chains, for example separate output chains providing different power amplifiers and different antennas. The distribution of the frequency shifts introduced into the carrier signal C by means of the frequency shifter circuits 216 and 218 may be freely selected, and in accordance with an example, one of the shifts may also be zero, i.e. one of the carrier signals C1 and C2 may be the original carrier signal C output by the PLL circuit 204.

In accordance with the example methods and apparatus described herein, the drawbacks mentioned above with regard to a conventional approach due to the existing crosstalk are avoided. Actually, no crosstalk exists, as there is only one PLL circuit which, in turn, results in an improved signal performance. This performance improvement may also be used for reducing the power amplifier current that is needed for a power amplifier in the above mentioned output chain so that a current consumption of an apparatus including the above described circuit for generating a multicarrier signal with only one PLL circuit can be improved. Further, in the circuit itself, by using only one or a single PLL circuit or a single carrier signal generating circuit, current consumption and area consumption is improved which may be especially important for LTE, where each PLL circuit needs to cover a very wide range of frequency, thus making them large as each PLL circuit may need several oscillators to cover this range.

In the example depicted in FIG. 3 two modulated carrier signal MC1 and MC2 are generated based on a PLL circuit providing a commonly used carrier signal C on the basis of which the respective carrier signals C1 and C2 at the desired frequency are generated and modulated. It is noted that in accordance with other examples, more than two modulated carrier signals may be generated, using a single output signal C. In such examples, a further frequency shift circuit and a further modulator would be provided for receiving a further carrier signal to be modulated by a further input signal and to be output.

The following examples of the circuit of FIG. 3 for implementing an I/Q modulator and a polar modulator will be described.

Figure 4:
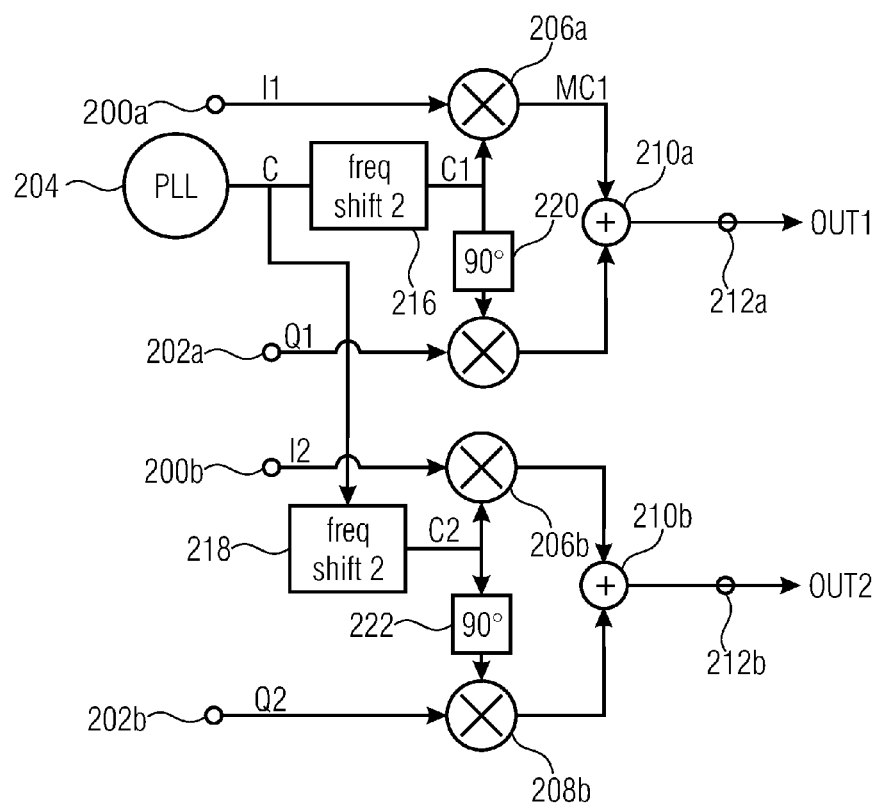
FIG. 4 shows an example of an I/Q modulator implemented on the basis of a circuit of FIG. 3.

FIG. 4 shows an I/Q modulator implementation including the above described approach for generating the multicarrier signal with one PLL circuit. The I/Q modulator of FIG. 4 is for generating a multicarrier signal based on two I/Q input signals, namely based on the input signals I1/Q1 and I2/Q2. The circuit of FIG. 4 includes a first input having a first terminal 200a for receiving the I-component I1 of the first I/Q signal and a second terminal for receiving the Q-component Q1 of the first I/Q signal. The input signal I1 is applied to the mixer 206a, and the input signal Q1 is applied to the mixer 208a. Further, the circuit includes a second input having a first terminal 200b for receiving the I-component I2 of the second I/Q signal, and a second terminal 202b for receiving the Q-component, Q2 of the second I/Q input signal. The input signal I2 is received by the mixer 206b, and the input signal Q2 is received by the mixer 208b. A single carrier signal C is provided by the one PLL circuit 204 provided in the circuit of FIG. 4, and by means of the frequency shifter circuits 216 and 218 the respective carrier signals C1 and C2 are provided. Further, between the first frequency shifter circuit 216 and the mixer 208a, and also between the second frequency shifter circuit 218 and the mixer 208b respective 90° phase shifter circuits 220 and 222 are provided. Thus, the carrier signal C1 is applied to the mixer 206a, and the carrier signal with a 90° phase shift introduced by the phase shifter 220 is applied to the mixer 208a. In the same way, the signal C2 is applied to the mixer 206b and the phase-shifted version thereof is applied to the mixer 208b. The respective output signals from the mixer 206a, 208a and 206b, and 208b, respectively, are output to the combiners 210a and 210b for outputting the respective modulated carriers at the outputs 212a and 212b. It is noted that the outputs 212a and 212b may be combined for further processing or may be kept separate, for example for being output via two separate antennas.

The 90° phase shifter circuits 220 and 222 are shown in the example of FIG. 4 to be arranged between the respective frequency shifter circuits and the respective modulators. However, in another different circuit arrangement the phase shift may be introduced before the frequency shift. In such an implementation, a first signal path from the PLL circuit 204 to the mixer 206a would include only a first frequency shifter circuit and a second, separate path from the PLL circuit 204 to the modulator 208a will include the phase shifter circuit 220 followed by a further frequency shifter applying the same frequency shift as in the first path, thereby generating the carrier signal C1 at the desired frequency and the carrier signal C1 at the desired frequency with a 90° phase shift.

Figure 5:
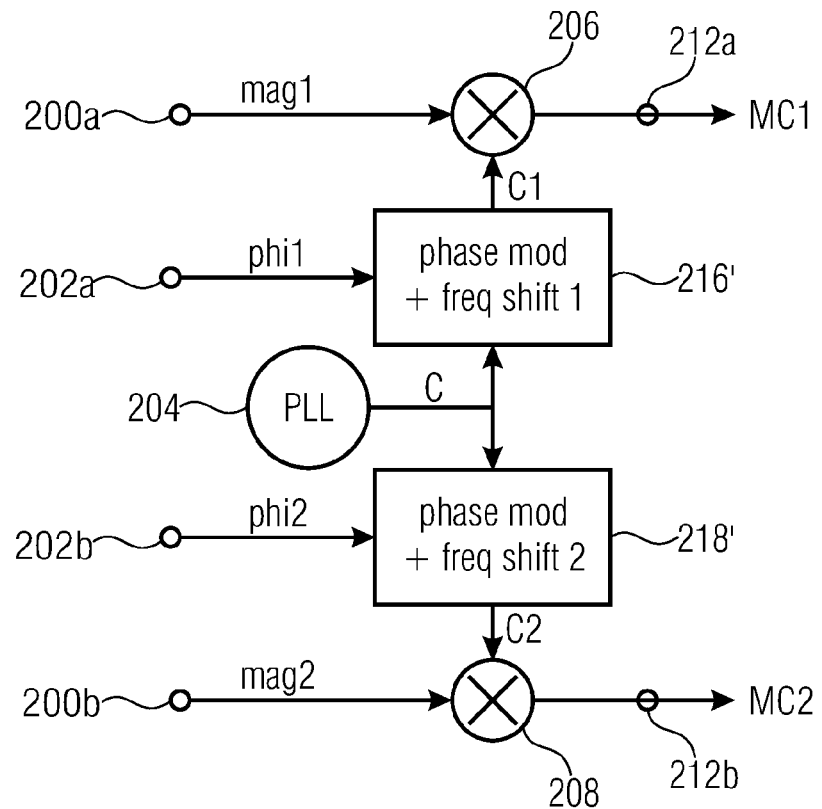
FIG. 5 shows an example of a polar modulator implemented on the basis of a circuit of FIG. 3.

FIG. 5 shows an example of a polar modulator including a circuit for generating multicarrier signals with one PLL circuit. The circuit comprises the first input having a first input terminal 200a for receiving the magnitude component mag1 of the polar signal, and a second input terminal 200b for obtaining the angular component phi1 of the polar signal. The second input, likewise, comprises a first input terminal 202a for receiving the magnitude component mag2 of the second polar signal and a second input terminal 202b for receiving the angular component phi2 of the second polar input signal. The circuit includes modified frequency shifter circuits 216', 218' receiving the unmodulated carrier signal C or the common carrier signal C from the single PLL circuit 204 provided in the circuit of FIG. 5 and also receiving the angular components of the respective first and second polar input signals from the terminals 200b and 202b, thereby providing the phase modulated and frequency shifted carrier signals C1 and C2 that are applied to the respective mixers 206 and 208 that also receive the magnitude components mag1 and mag2 of the two polar input signals from the terminals 200a and 202a for generating the modulated carrier signals MC1 and MC2. In the embodiment of FIG. 5, the circuit includes two outputs 212a and 212b for outputting the respective modulated carrier signals MC1 and MC2, for example, for further processing them via different output chains, for example for transmission via separate antennas. Alternatively, like in FIG. 3, the output signals MC1 and MC2 may be combined for processing them via a single output chain, for example for transmitting them via a single antenna.

The frequency shifter circuit described above may be implemented by means of a digital-to-time-converter receiving a frequency input signal for determining the frequency shift to be applied to the carrier signal C. In accordance with examples, the frequency input signal can be a static signal, but can also be variable for allowing dynamic frequency switching use cases. The latter is desired in case activation and/or position of one or both of the carrier signals changes dynamically. In such a case, the PLL circuit 204 may be constant at a fixed frequency.

Figure 6:
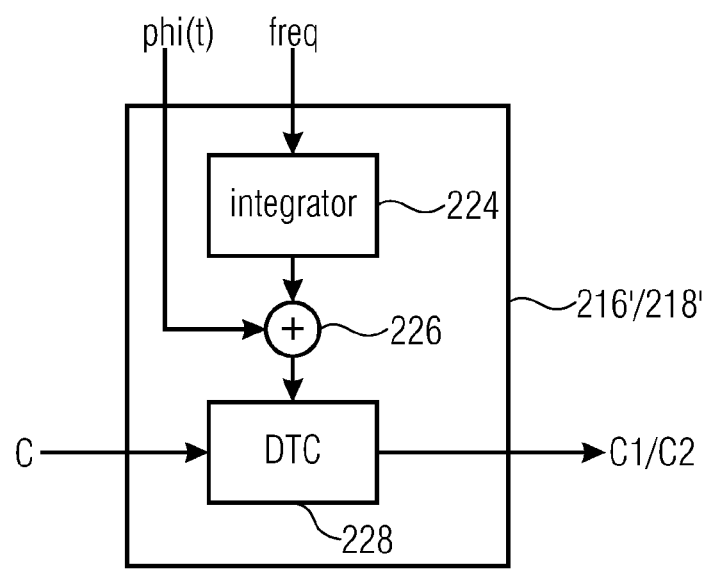
FIG. 6 shows an example of a frequency shifter circuit including also the phase modulator as it may be used in a polar modulator depicted in FIG. 5.

FIG. 6 shows an example of the frequency shifter circuit 216', 218' as it may be used in a polar modulator depicted in FIG. 5. The frequency shifter circuit may also include a phase modulator. As can be seen, the circuit receives a frequency selection signal FREQ that is applied to an integrator 224. The output signal of the integrator 224 is applied to a combiner 226 receiving the angular component of the polar signal and outputs a phase shifted frequency control signal to the DTC circuit 228. The DTC circuit 228 receives the unmodulated carrier signals, for example the unmodulated local oscillator signal, and outputs the modulated local oscillator signal or the carrier signal. When using the circuit of FIG. 6 in an I/Q modulator as it is depicted, for example, in FIG. 4, the combiner 226 is omitted so that the DTC circuit 228 is controlled based on the output signal obtained from the integrator 224 for generating, on the basis of the single or common carrier signal C provided by the PLL circuit 204 the frequency-shifted carrier signal C1 or C2.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like a microprocessor, a programmable computer or an electronic circuit. Some one or more of the most important method steps may be executed by such an apparatus.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

The invention claimed is:

1. A method for generating a plurality of I/Q modulated signals, the method comprising:
    providing a phase locked loop (PLL) circuit for outputting a common output signal at a predefined frequency;
    applying a first frequency shift to the common output signal of the PLL circuit to obtain a first carrier signal;
    applying a second frequency shift to the common output signal of the PLL circuit to obtain a second carrier signal, wherein the first frequency shift and the second frequency shift are different from one another;
    modulating the first and second carrier signals based on first and second I/Q-input signals;
    wherein the first I/Q input signal comprises a first in-phase component and a first quadrature component and the second I/Q input signal comprises a second in-phase component and a second quadrature component; and
    combining the first and second modulated carrier signals into a single output signal.

2. A method for generating a plurality of polar modulated signals, the method comprising:
    providing a phase locked loop (PLL) circuit for outputting a common output signal at a predefined frequency;
    applying a first frequency shift and an angular signal of a first polar input signal to the common output signal of the PLL circuit to obtain a first carrier signal;
    applying a second frequency shift and an angular signal of a second polar input signal to the common output signal of the PLL circuit to obtain a second carrier signal, wherein the first frequency shift and the second frequency shift are different from one another; and
    mixing the first and second carrier signals and the magnitude signals of the first and second polar signals.

3. An apparatus, comprising:
a carrier signal generation circuit configured to generate an output signal;
a frequency shifter circuit coupled to the carrier signal generation circuit and configured to apply a frequency shift to the output signal of the carrier signal generation circuit to obtain a first carrier signal and a second carrier signal at different frequencies;
a modulator circuit coupled to the frequency shifter circuit and configured to modulate the first and second carrier signals; and
a combiner configured to combine the modulated first and second carrier signals;
wherein the modulator circuit comprises a first modulator and a second modulator, and wherein the frequency shifter comprises a first frequency shifter coupled between the carrier signal generation circuit and the first modulator and a second frequency shifter coupled between the carrier signal generation circuit and the second modulator; and
wherein the first modulator comprises a first in-phase/quadrature (I/Q) modulator receiving a first I/Q input signal comprising a first in-phase component and a first quadrature component, and wherein the second modulator comprises a second I/Q modulator receiving a second I/Q input signal comprising a second in-phase component and a second quadrature component; or
wherein the first frequency shifter is configured to apply an angular signal of a first polar signal to the first carrier signal to form a first resulting signal and the first modulator comprises a first polar modulator configured to mix the first resulting signal and a magnitude of the first polar signal to form the first modulated carrier signal, and wherein the second frequency shifter is configured to apply an angular signal of a second polar signal to the second carrier signal to form a second resulting signal and the second modulator comprises a second polar modulator configured to mix the second resulting signal and a magnitude signal of the second polar signal to form the second modulated carrier signal.

4. The apparatus of claim 3, wherein the frequency shifter circuit is configured to apply to at least one of the first and second carrier signals a frequency shift.

5. An apparatus for generating a plurality of modulated signals, the apparatus comprising:
a first input configured to receive a first input signal;
a second input configured to receive a second input signal;
a first modulator connected to the first input;
a second modulator connected to the second input; and
a phase locked loop (PLL) circuit configured to provide a common output signal at a desired frequency and comprising an output connected to the first modulator via a first frequency shifter circuit and to a second modulator via a second frequency shifter circuit, wherein the first and second frequency shifter circuits are configured to apply different frequency shifts to the common output signal;
wherein the first modulator comprises a first in-phase/quadrature (I/Q) modulator receiving a first I/Q input signal comprising a first in-phase component and a first quadrature component, and wherein the second modulator comprises a second I/Q modulator receiving a second I/Q input signal comprising a second in-phase component and a second quadrature component; or
wherein the first frequency shifter circuit is further configured to apply an angular signal of a first polar signal to a first frequency shifted common output signal of the PLL to form a first resulting signal and the first modulator comprises a first polar modulator configured to mix the first resulting signal and a magnitude of the first polar signal to form a first modulated carrier signal, and wherein the second frequency shifter circuit is further configured to apply an angular signal of a second polar signal to a second frequency shifted common output signal of the PLL to form a second resulting signal and the second modulator comprises a second polar modulator configured to mix the second resulting signal and a magnitude signal of the second polar signal to form a second modulated carrier signal.

6. The apparatus of claim 5, wherein at least one of the first and second frequency shifter circuits applies a frequency shift to the common output signal of the PLL circuit.

7. The apparatus of claim 5, comprising:
a combiner connected to an output of the first modulator and to an output of the second modulator.

8. A mobile communication device, comprising: an apparatus for generating a plurality of modulated signals, the apparatus comprising:
a carrier signal generation circuit configured to generate an output signal;
a frequency shifter circuit coupled to the carrier signal generation circuit and configured to apply a frequency shift to the output signal of the carrier signal generation circuit to obtain a first carrier signal and a second carrier signal at different frequencies;
a modulator circuit coupled to the frequency shifter circuit and configured to modulate the first and second carrier signals; and
a combiner configured to combine the modulated first and second carrier signals;
wherein the modulator circuit comprises a first modulator and a second modulator, and wherein the frequency shifter circuit comprises a first frequency shifter coupled between the carrier signal generation circuit and the first modulator and a second frequency shifter coupled between the carrier signal generation circuit and the second modulator; and
wherein the first modulator comprises a first in-phase/quadrature (I/Q) modulator receiving a first I/Q input signal comprising a first in-phase component and a first quadrature component, and wherein the second modulator comprises a second I/Q modulator receiving a second I/Q input signal comprising a second in-phase component and a second quadrature component; or
wherein the first frequency shifter is configured to apply an angular signal of a first polar signal to the first carrier signal to form a first resulting signal and the first modulator comprises a first polar modulator configured to mix the first resulting signal and a magnitude of the first polar signal to form the first modulated carrier signal, and wherein the second frequency shifter is configured to apply an angular signal of a second polar signal to the second carrier signal to form a second resulting signal and the second modulator comprises a second polar modulator configured to mix the second resulting signal and a magnitude signal of the second polar signal to form the second modulated carrier signal.

* * * * *